United States Patent
Hagström

(12) 
(10) Patent No.: US 11,002,448 B2
(45) Date of Patent: May 11, 2021

(54) BURNER FOR A PORTABLE STOVE AND PORTABLE STOVE

(71) Applicant: Fenix Outdoor AB, Örnsköldsvik (SE)

(72) Inventor: Magnus Fredrik Hagström, Johanneshov (SE)

(73) Assignee: Fenix Outdoor AB, Örnsköldsvik (SE)

( * ) Notice: Subject to any disclaimer, the term of this patent is extended or adjusted under 35 U.S.C. 154(b) by 421 days.

(21) Appl. No.: 14/120,381

(22) Filed: May 14, 2014

(65) Prior Publication Data

US 2014/0338651 A1  Nov. 20, 2014

(30) Foreign Application Priority Data

May 14, 2013 (EM) .................................. 13167748

(51) Int. Cl.
 *F24C 3/08* (2006.01)
 *F23D 14/28* (2006.01)
 (Continued)

(52) U.S. Cl.
 CPC .................. *F24C 3/08* (2013.01); *A47J 36/26* (2013.01); *F23D 14/08* (2013.01); *F23D 14/28* (2013.01);
 (Continued)

(58) Field of Classification Search
 USPC ...................... 126/4, 9, 39 R, 39 B, 85 R, 40
 See application file for complete search history.

(56) References Cited

U.S. PATENT DOCUMENTS 28,761 A * 6/1860 McGlensey ............... F24C 3/14
  126/40
168,764 A * 10/1875 Mooney .................... F24C 3/14
  126/40
(Continued)

FOREIGN PATENT DOCUMENTS

EP  0 439 346  *  7/1991
EP  0 905 445 A1  3/1999
(Continued)

OTHER PUBLICATIONS

Extended European Search Report, dated Sep. 30, 2013, for corresponding European Patent No. 13 16 7748.
(Continued)

*Primary Examiner* — Avinash A Savani
*Assistant Examiner* — Martha M Becton
(74) *Attorney, Agent, or Firm* — Intellectual Property Law Group LLP

(57) ABSTRACT

The present invention relates to a burner (2) for a portable stove comprising a burner head (3), a mixing tube (4), a plurality of primary air ports (7) being disposed on the mixing tube (4) and an orifice (5) through which a gaseous combustible enters into the mixing tube (3) to form a gaseous mixture with ambient air. The burner head (3) is composed of an upper burner part (8) with a plurality of burner ports (11) and a burner lower part (9), the lower burner part being connectable to the mixing tube (4). The invention is characterized in that a dividing means (13) is disposed within the burner head (3). The dividing means (13) and the lower burner part (9) forming a first flow channel (C1) for the gaseous mixture, and the dividing means (13) and the upper burner part (9) forming a second flow channel (C2) for the gaseous mixture being connected to the first flow channel (C1).

13 Claims, 5 Drawing Sheets

(51) Int. Cl.
*A47J 36/26* (2006.01)
*F23D 14/08* (2006.01)
*F23D 14/64* (2006.01)
*F24C 3/14* (2006.01)

(52) U.S. Cl.
CPC ............... *F23D 14/64* (2013.01); *F24C 3/14* (2013.01); *F23D 2203/102* (2013.01); *F23D 2900/00003* (2013.01)

(56) References Cited

U.S. PATENT DOCUMENTS

| | | | | |
|---|---|---|---|---|
| 173,940 | A * | 2/1876 | Gleason | F24C 3/14 126/40 |
| 302,015 | A * | 7/1884 | Musgrave | F24C 3/14 126/40 |
| 347,561 | A * | 8/1886 | Bisbee | F24C 3/14 126/253 |
| 411,649 | A * | 9/1889 | Doty | F24C 3/14 126/40 |
| 624,071 | A * | 5/1899 | McCartney | F24C 3/14 126/214 C |
| 707,970 | A * | 8/1902 | Keenan | F24C 3/14 126/40 |
| 934,120 | A * | 9/1909 | Williams | F23D 91/02 126/252 |
| 936,815 | A * | 10/1909 | Schemnitz | F23D 91/02 126/240 |
| 1,360,795 | A * | 11/1920 | Regan | F24C 3/002 126/85 R |
| 1,394,228 | A * | 10/1921 | Sheridan | F23D 14/04 126/25 A |
| 1,423,961 | A * | 7/1922 | Murphy | A47J 39/00 126/39 F |
| 1,822,356 | A * | 9/1931 | McCartney | B23K 1/008 126/240 |
| 2,142,418 | A * | 1/1939 | Stocker | A47J 31/50 126/214 C |
| 2,154,305 | A * | 4/1939 | Goerl | A47J 36/26 126/38 |
| D133,053 | S * | 7/1942 | Robinson | D7/337 |
| 2,354,221 | A * | 7/1944 | Robinson | F24C 5/20 126/38 |
| 2,397,766 | A * | 4/1946 | Tullis | F23D 11/44 126/38 |
| 2,400,030 | A | 5/1946 | Stainbrook | |
| 2,465,572 | A * | 3/1949 | Bramming | F24C 5/20 431/344 |
| 2,538,538 | A * | 1/1951 | Stempel | F24C 5/20 126/38 |
| 2,853,126 | A * | 9/1958 | Corlet | F24C 3/14 222/5 |
| 2,954,024 | A * | 9/1960 | Webster | F24C 3/14 126/38 |
| 3,156,379 | A * | 11/1964 | Corlet | F17C 13/084 222/5 |
| D201,234 | S * | 5/1965 | Busse | D7/337 |
| 3,361,298 | A * | 1/1968 | Trumble | F24C 5/18 222/5 |
| 3,513,822 | A * | 5/1970 | Korngold | A47J 37/0713 126/25 R |
| 3,608,538 | A * | 9/1971 | Guerrero | F24C 3/14 126/266 |
| 3,648,680 | A * | 3/1972 | Hein | F24C 3/14 126/38 |
| 3,667,449 | A * | 6/1972 | Persinger | A47J 37/0713 126/25 R |
| 3,907,490 | A * | 9/1975 | Schaller | F17C 13/04 431/142 |
| 4,082,993 | A * | 4/1978 | Oakes | F17C 13/04 126/40 |
| 4,105,013 | A * | 8/1978 | Vache | A47J 36/26 126/38 |
| D249,448 | S * | 9/1978 | Vache | D7/337 |
| 4,177,790 | A * | 12/1979 | Zenzaburo | F24C 3/14 126/38 |
| 4,192,284 | A * | 3/1980 | Vache | F24C 3/14 126/29 |
| 4,338,075 | A * | 7/1982 | Bemm | F21S 13/00 126/252 |
| 4,364,372 | A * | 12/1982 | Johnson | F24C 1/16 126/39 R |
| 4,461,271 | A * | 7/1984 | Juang | F17C 13/084 126/38 |
| 4,653,462 | A * | 3/1987 | DeFoe | F24C 15/36 126/24 |
| 4,726,350 | A * | 2/1988 | Steinhauser | F24C 3/14 126/214 D |
| 5,345,768 | A * | 9/1994 | Washam | F23C 7/004 60/737 |
| 5,437,262 | A * | 8/1995 | George, II | F24C 3/085 126/39 H |
| 5,513,624 | A * | 5/1996 | Vorhis | F24C 3/14 126/38 |
| 5,573,393 | A * | 11/1996 | Tsai | F23D 14/28 126/406 |
| 5,803,727 | A * | 9/1998 | Long | F23D 11/443 126/38 |
| 5,957,683 | A * | 9/1999 | Yokoyama | F23D 14/06 126/39 R |
| 5,964,213 | A * | 10/1999 | Tran | A47J 37/0713 126/39 K |
| 6,042,368 | A * | 3/2000 | Champion | F23D 14/28 137/505.39 |
| 6,173,709 | B1 * | 1/2001 | Yokoyama | F23D 14/06 126/39 E |
| 6,182,651 | B1 * | 2/2001 | Tornsten | F23D 11/443 126/38 |
| 6,213,760 | B1 * | 4/2001 | Yokoyama | F24C 3/103 431/247 |
| D446,991 | S * | 8/2001 | Taniguchi | D7/337 |
| 7,168,426 | B1 * | 1/2007 | Hsu | A47J 36/26 126/256 |
| D610,390 | S * | 2/2010 | Nishijima | D7/332 |
| 7,950,920 | B2 * | 5/2011 | Vale | F23D 11/36 126/4 |
| 8,011,358 | B2 * | 9/2011 | Galindo | F23D 14/06 126/39 E |
| D680,799 | S * | 4/2013 | Chung | D7/337 |
| D683,999 | S * | 6/2013 | Karlsson | D7/337 |
| 10,072,838 | B2 * | 9/2018 | Kim | F23D 11/443 |
| 2006/0225724 | A1 * | 10/2006 | Turner | F24B 1/202 126/9 R |
| 2007/0006868 | A1 * | 1/2007 | Svedlund | F24C 3/14 126/39 N |
| 2007/0087297 | A1 * | 4/2007 | Long | F23D 11/46 431/247 |
| 2014/0318528 | A1 * | 10/2014 | Quintaba' | F23D 14/085 126/39 E |

FOREIGN PATENT DOCUMENTS

| | | |
|---|---|---|
| FR | 1 178 993 A | 5/1959 |
| FR | 2 710 726 A1 | 4/1995 |
| GB | 1 433 771 A | 4/1976 |

OTHER PUBLICATIONS

European Office Action dated Jun. 22, 2020 for corresponding European application No. 13 167 748.6 (7 pages).

* cited by examiner

BURNER FOR A PORTABLE STOVE AND PORTABLE STOVE

CROSS-REFERENCE TO RELATED APPLICATIONS

This application claims the benefit of European Patent Application No. 13 167 748.6, filed on May 14, 2013 in the European Patent Office, the entire disclosure of which is incorporated herein by reference.

BACKGROUND OF THE INVENTION

1. Field of the Invention

The present invention is directed to a burner for a portable stove and a portable stove. The burner comprises a burner head, a mixing tube, a plurality of primary air ports being disposed on the mixing tube and an orifice through which a gaseous combustible enters into the mixing tube. The burner head is composed of an upper burner part with a plurality of burner ports and a burner lower part, the lower burner part being connectable to the mixing tube.

2. Background

Such burners are conventionally used with portable atmospheric pressure stoves for camping purposes and are know from the prior art. Conventionally, the burner is connected to a combustible container via a hose or vertically mounted on the combustible container, and such latter stoves are known as canister mounted gas stove or as top mounted gas stove. The gaseous combustible, e.g. propane or LPG, enters the mixing tube through the orifice as a small stream of constant velocity. In streaming through the mixing tube, the gaseous combustible passes the primary air ports and creates a negative pressure at the primary air port. This pressure difference will suck air from the atmosphere into the mixing tube which will then mix with the gaseous combustible. About 60% of the air needed for a complete a clean combustion has to be provided at this step, whilst the remaining about 40% will directly be provided to the flame exiting the burner ports after having passed the mixing tube and the burner head. In the following, gaseous combustible denotes the pure combustible and gaseous mixture denotes the mixture or flow of gaseous combustible and ambient air.

To allow for a sufficient mixture between the gaseous combustible and the air, the mixing tube has to be of an adequate length. If the mixing tube is too short for a proper mixture, the flame will unstably burn or an incomplete combustion may occur, leading to harmful unburnt exhaust gases. Therefore, the burners know from the prior art all have a relatively long mixing tube in common. Accordingly, the overall height of the burner (and therefore of the portable stove) is limited by the minimal length required for the mixing tube.

However, if the burner is comparably large in height, the total height of the portable stove in use composed of the combustible container, the burner and a pot is impractical and unstable as it may easily tip over. As a matter of course, the might lead to dangerous situations especially in remote locations as not only the food to prepared is lost, but also an increase risk of fire and injury has to be noted. Furthermore, transporting a burner with a relatively long mixing tube is inconvenient for the user.

SUMMARY OF THE INVENTION

Thus, it is the technical objective of the present invention to provide a burner having a reduced height compared to the burners known from the prior art, as this will lead to an overall stove being of smaller height.

The problem is solved with a burner according to claim 1 and a portable stove according to claim 13. Preferred embodiments of the present invention are disclosed and described in claims 2 to 12.

The inventive burner is characterized in that a dividing means is disposed within the burner head. The dividing means and the lower burner part form a first flow channel for the gaseous mixture and the dividing means and the upper burner part form a second flow channel for the gaseous mixture being connected to the first flow channel. Accordingly, the gaseous combustible does not directly flow from the mixing tube through the burner head to the burner ports, but is forced to pass the first flow channel and subsequently the second flow channel.

Accordingly, as the step of mixing the gaseous combustible with ambient air is shifted from the mixing tube to the burner head and the dividing means, the mixing tube can greatly be reduced in height without resulting in an inadequate gaseous mixture. That is because the accumulated length of the first and second flow channel allows for a sufficient gaseous mixture.

Further, the cross section area of the first flow channel is less than the cross section area of the second flow channel. Alternatively, the cross section area of the second flow channel can be less than the cross section area of the first flow channel. As the cross section area of either the first flow channel or the second flow channel is less than that of the other one, the gaseous mixture is accelerated when entering the respective channel. This will in turn lead to a pressure gradient between the first flow channel and the second flow channel, based on Bernoulli's principle. The pressure gradient will provide for a continuous flow of homogenized gaseous mixture to the upper burner part and, thus, to the burner ports. It has to be noted that "cross section area" describes the area delimited by the dividing means and the lower burner part or the upper burner part respectively, when seen as a cross section through the burner head. Preferably, the volume of the first flow channel is less than the volume of the second flow channel.

According to another aspect of the invention the lower burner part comprises at least one supporting means, wherein the dividing means is supported by the supporting means. Thus, the dividing means can securely be attached to the lower burner part to allow for a durable and safe functionality of the burner.

Preferably, the at least one supporting means is a dent protruding from the lower burner part towards the upper burner part. A dent is easy to manufacture and can directly be produced, e.g. when the lower burner part is machined by compression moulding.

According to another aspect of the present invention, the duct height of the first flow channel is preferably less than the duct height of the second flow channel. As such, the duct height of the first flow channel is preferably between 0.5 mm and 4 mm and preferably between 1 mm and 2 mm. Furthermore, it is preferable for the duct height of the second flow channel to be between 1 mm and 8 mm, preferably between 2 mm and 4 mm. Thus, within these limits an exceptional mixing behaviour of gaseous combustible and ambient air is present.

Preferably, the mixing tube is configured to be of a length only depending on the size of the primary air ports. Thus, the length of the mixing tube can be chosen to be large enough to accommodate the primary air ports without the need for an outrunning length needed for the mixture of ambient air and gaseous combustible. Thus, the overall length of the mixing tube is smaller compared to those mixing tubes known from the prior art.

According to another aspect of the present invention, the burner head is a circular burner head and the dividing means is a disc. Thus, the disc disposed within the burner head creates a first flow path between the disc's lower surface and lower burner part and a second flow path between the disc's upper surface and the upper burner part. The gaseous mixture entering the burner head from the mixing tube will be forced through the circular first flow path and can enter the circular second flow path along the entire circumference of the disc. This will further improve the homogenization of the gaseous mixture.

Preferably, the diameter of the burner head is about 1.05 to 1.5 times larger than the diameter of the disc. Thus, when the disc is centred relative to the burner head, this will create a connecting flow path circumferentially connecting the first flow path and the second flow path along the circumference of the disc. The diameters of the disc and the burner head being attuned to each other will provide for a connecting flow path greatly supporting the homogenization of the gaseous mixture.

According to another aspect of the present invention, the burner ports are disposed on a single flame crown, the flame crown being centred on the upper burner part. This will ease the handling of the burner and the portable stove, especially when used in the field.

According to another aspect of the present invention, the orifice has a first diameter, the interior of the burner head has a second diameter, and the flame crown has a third diameter, wherein the first diameter and the third diameter are smaller than the second diameter. More preferably, the first diameter is the smallest diameter. Thus, the gaseous mixture when streaming from the orifice to the burner ports disposed on the flame crown has to pass three different diameters allowing for different expansion and/or compression of the gaseous mixture. The interplay between expansion and compression greatly supports the homogeneity of the gaseous mixture.

Furthermore, the present invention is directed to a portable stove comprising an inventive burner as afore described. Thus, an according portable stove will in total have a reduced height compared to the stoves known from the prior art.

BRIEF DESCRIPTION OF THE DRAWINGS

Specific embodiments of the invention will now be described below, by way of example, with reference to accompanying drawings, of which.

DETAILED DESCRIPTION OF SPECIFIC EMBODIMENTS

Figure 1:
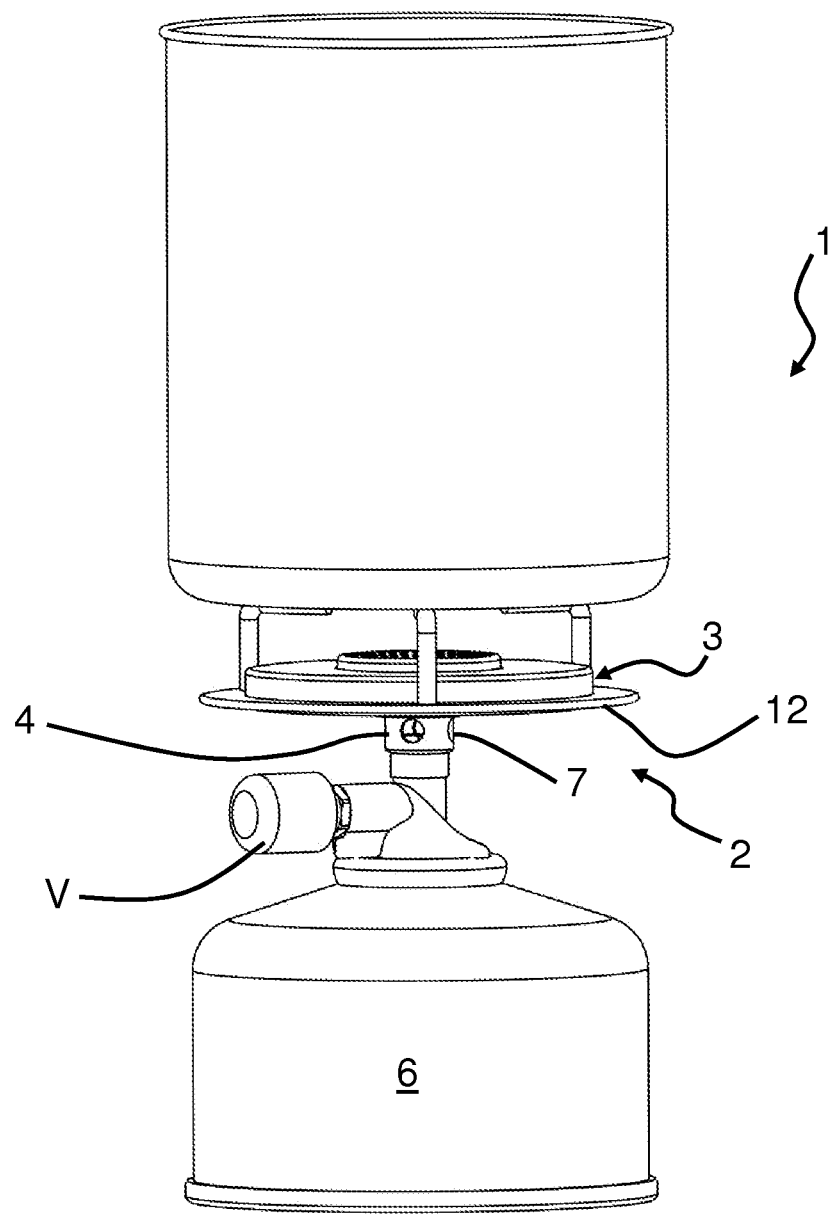
FIG. 1 is a perspective view of a portable stove comprising an inventive burner.
Figure 2:
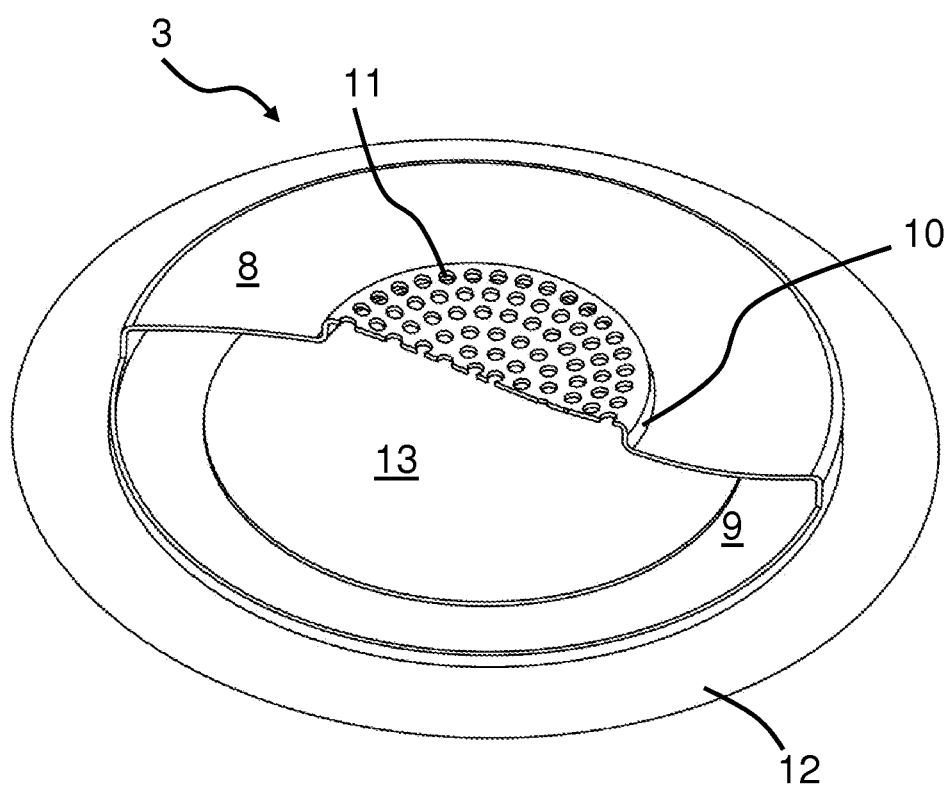
FIG. 2 is a perspective cutout of the burner head.

FIG. 1 shows a portable stove 1 of the top mounted stove-type. The portable stove comprises a burner 2 having a burner head 3, a mixing tube 4, an orifice 5 through which the gaseous combustible stored in the container 6, e.g. propane can be delivered to the mixing tube 4 via the valve V. The mixing tube 4 is provided with a plurality of primary air ports 7 on its outer peripheral surface through which ambient air can be sucked into the mixing tube 4 to mix with the gaseous combustible to form the gaseous mixture. As can greatly be seen e.g. in FIG. 3, the length of the mixing tube is defined by the diameter of the primary air ports 7. In other words, the length of the mixing tube 4 is chosen such that the air ports 7 have a sufficient dimension, but no further length is required.

As shown in FIG. 2 to FIG. 5, the burner head 3 is composed of an upper burner part 8 and a lower burner part 9. The upper burner part 9 is provided with a cylindrical shaped centred flame crown 10 with a plurality of burner ports 11 through which the gaseous mixture exits the burner to establish the flame. The lower burner part 9 is connected to the mixing tube 4. The lower burner part 9 and the upper burner part 8 are connected by a circumferential folded portion 12.

Furthermore, a dividing means 13 in form of a disc is disposed between the upper burner part 8 and the lower burner part 9, i.e. it is encapsulated within the burner head 3. The disc 13 forms a first flow channel C1 for the gaseous mixture with the lower burner part 9. In addition, the disc 13 forms a second flow channel C2 for the gaseous mixture with the upper burner part 8. The duct height of the first flow channel H1 is smaller than the duct height of the second flow channel H2, in this example, the duct height of the first flow channel H1 is about 2 mm wherein the duct height of the second flow channel H2 is about 4 mm. As such, in this embodiment the cross section area of the first flow channel C1 is less than the cross section area of the second flow channel C2. Accordingly, this will also lead to the volume of the first flow channel C1 to be less than the volume of the second flow channel C2.

The disc 13 is supported by a plurality of dents 14 protruding from the lower burner part 9 towards the upper burner part 8. As can greatly be seen from FIG. 3, the disc 13 has a diameter which is smaller than the inner diameter of the burner head 3 as defined by the upper burner part 8 and the lower burner part 9. In this example, the diameter of the burner head 3 is about 1.3 times larger than the diameter of the disc. Thus, the connecting flow path C3 is defined around the circumference of the disc 13 connecting the first flow channel C1 and the second flow channel C2.

Accordingly, there are three different diameters allowing for different expansion and/or compression of the gaseous mixture along its flow path from the inner diameter of the mixing tube 4 until exiting through the plurality of burner ports 11. As can be seen from FIG. 3, the first diameter D1 is the diameter of exit opening of the inner diameter of the mixing tube 4, the second diameter D2 is the diameter of the interior of the burner head 3 and is defined by the upper burner part 8 and the lower burner part 9 respectively, and the third diameter D3 is the diameter defined by the flame crown 10. The first diameter D1 is the smallest diameter, the second diameter D3 is the biggest diameter and the third diameter D3 is in between the first diameter D1 and the second diameter D3, i.e. D1<D3<D2.

Figure 3:
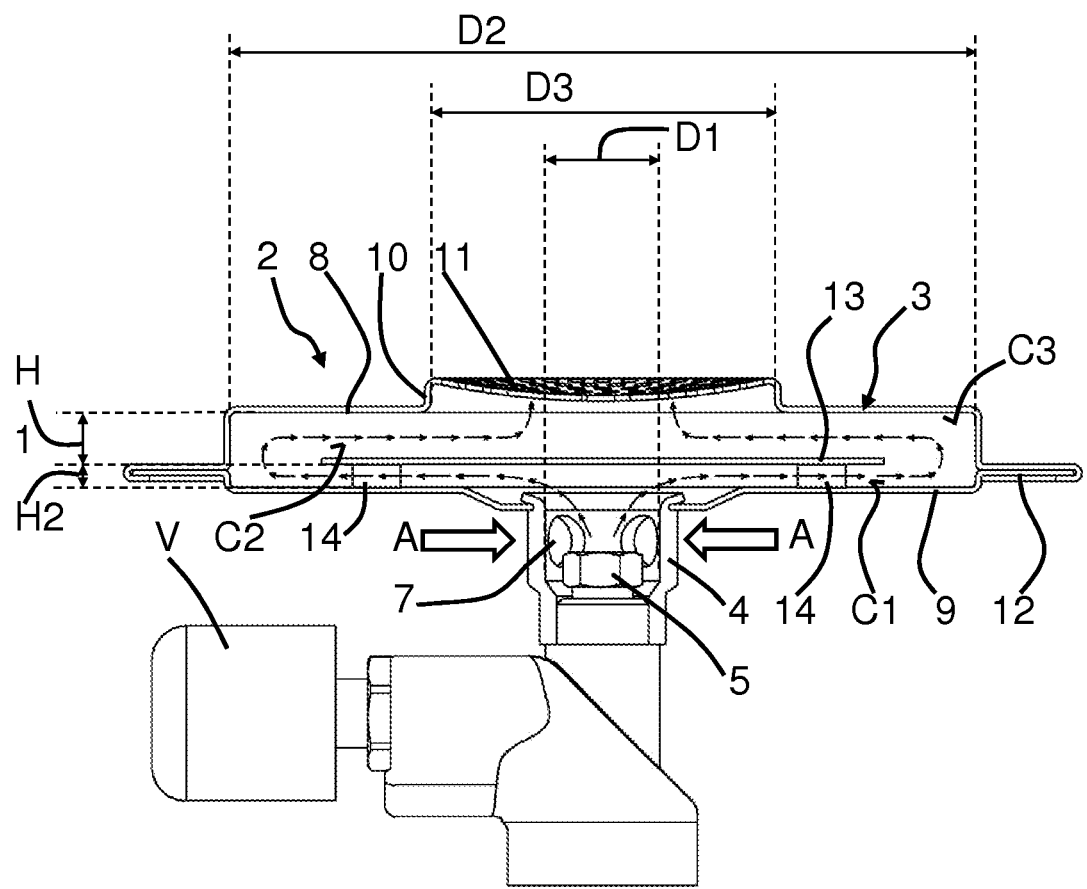
FIG. 3 is a cross section of the burner head with exemplified gas-flow.
Figure 4:
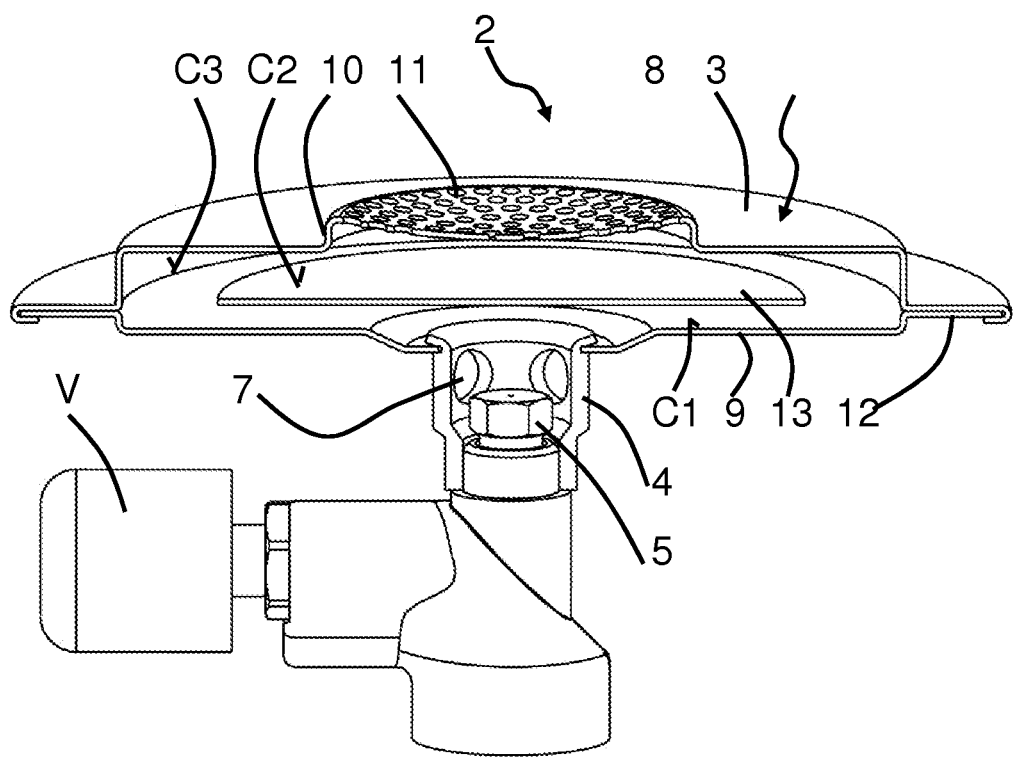
FIG. 4 is a perspective cross section of the burner.
Figure 5:
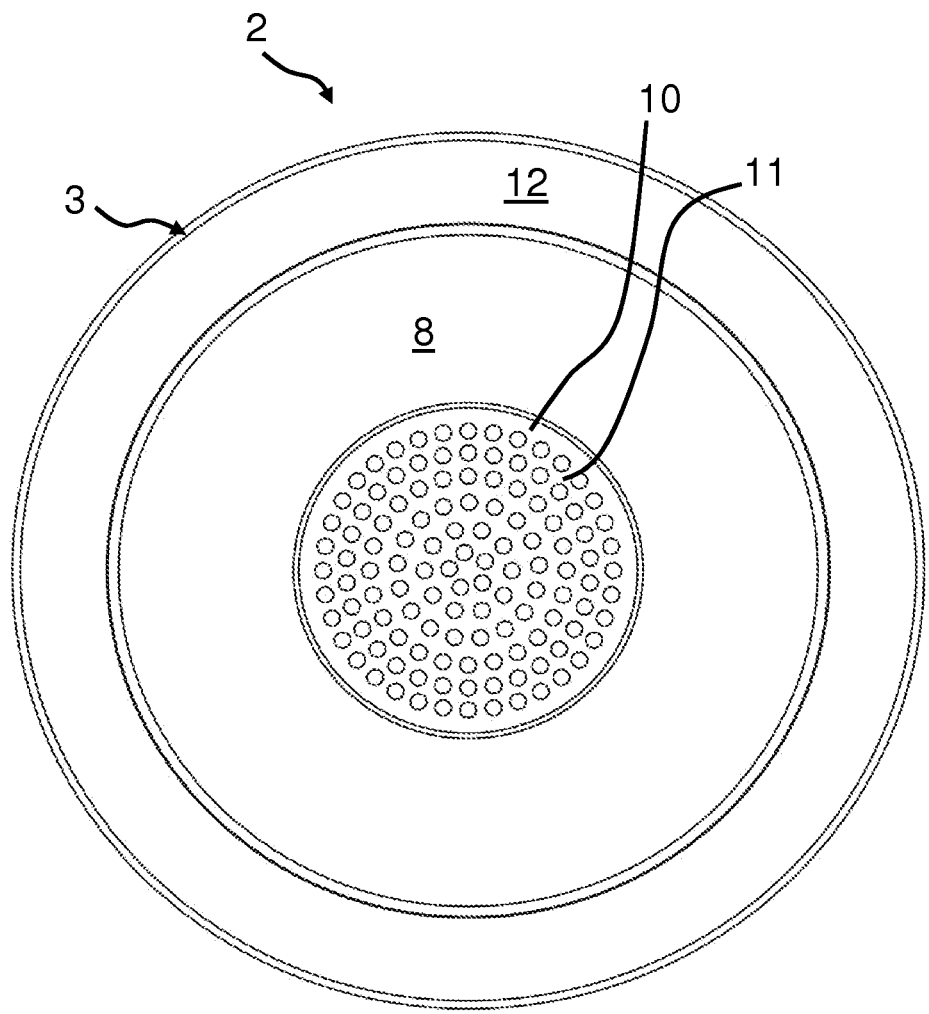
FIG. 5 is a top view of the inventive burner.

Next, the principle of the burner 2 will be described in detail with reference to FIG. 3. Opening the valve V will deliver gaseous combustible from the container 6 to the mixing tube 4 through the orifice 5. Thus, a small stream of gaseous combustible is created by the orifice 5 at a constant velocity and it passes the primary air ports 7 when streaming along the length of the mixing tube 4. A negative pressure is thus created at the primary air ports 7 sucking ambient air A through the primary air ports 7 into the mixing tube 4. A first mixing between the gaseous combustible and the primary air A is achieved in the mixing tube, but the gaseous mixture is not uniform enough to ensure a stable flame pattern and complete combustion. The pre-mixed gaseous mixture then enters the burner head 3 and passes through the relatively small first flow channel C1 where it is accelerated due to Bernoulli's principle (also know as Venturi's law). This increase in velocity will lead to a drop in pressure in the first flow channel C1. When reaching the second flow channel C2 or the connecting flow channel C3 respectively, the gaseous mixture decreases in velocity and the pressure rises again, as the available second diameter D2 is larger and allows for expansion of the gaseous mixture. Thus, a pressure gradient is established between the first flow channel C1 and the second flow channel C2. This pressure gradient will aid the continuous flow of gaseous mixture to enter the upper burner part 8 and thus the flame crown 10 with the plurality of burner ports 11, wherein the diameter is again decreased to the third diameter D3 to ensure a uniform gaseous mixture. As a matter of course, the pressure gradient may be established vice versa, i.e. in that the second flow channel C2 is smaller than the first flow channel C1.

The total travelled length of the gaseous mixture and the expansion as it flows around the disc 13 and passing the three different diameters D1, D2 and D3 ensures a homogenous gaseous mixture of gaseous combustible and ambient air. This in total makes an elongated mixing tube dispensable, as the mixing is performed within the burner head 3 to a large degree.

LIST OF REFERENCE SIGNS 1 portable stove
2 burner
3 burner head
4 mixing tube
5 orifice
6 container
7 primary air ports
8 upper burner part
9 lower burner part
10 flame crown
11 burner ports
12 folded portion
13 dividing means/disc
14 dent
C1 first flow channel
C2 second flow channel
C3 connecting flow channel
D1 first diameter
D2 second diameter
D3 third diameter
H1 duct height of first flow channel
H2 duct height of second flow channel
A ambient air
V valve

What is claimed is:

1. A burner (2) for a portable stove (1) comprising a burner head (3), a vertical mixing tube (4) positioned beneath the burner head, a plurality of primary air ports (7) being disposed on an outer peripheral surface of the mixing tube (4) through which ambient air (A) enters the mixing tube, and an orifice (5) concentric with the mixing tube, through which a gaseous combustible enters into the mixing tube (4) to form a gaseous mixture with ambient air (A),
wherein the burner head (3) is composed of an upper burner part (8) with a plurality of burner ports (11) disposed on an uppermost surface of the upper burner part, and a burner lower part (9), the lower burner part (9) being connectable to the mixing tube (4),
characterized in that
a dividing means (13) is disposed within the burner head (3),
the dividing means (13) and the lower burner part (9) forming a first flow channel (C1) for the gaseous mixture, and the dividing means (13) and the upper burner part (8) forming a second flow channel (C2) for the gaseous mixture being connected to the first flow channel (C1), wherein a cross section area of either the first flow channel or the second flow channel (C2) is less than that of the other one, the burner head (3) is a circular burner head (3) and the dividing means (13) is a disc positioned beneath all the burner ports; and
the mixing tube (4) is of a length just long enough to accommodate a diameter of the primary air ports (7).

2. The burner (2) according to claim 1,
characterized in that
the lower burner part (9) comprises at least one supporting means (14), wherein the dividing means (13) is supported by the supporting means (14).

3. The burner (2) according to claim 2,
characterized in that
the at least one supporting means (14) is a dent protruding from the lower burner part (9) towards the upper burner part (8).

4. The burner (2) according to claim 1,
characterized in that
a duct height of the first flow channel (H1) is between 0.5 mm and 4 mm, preferably between 1 mm and 2 mm.

5. The burner (2) according to claim 1,
characterized in that
a duct height of the second flow channel (H2) is between 1 mm and 8 mm, preferably between 2 mm and 4 mm.

6. The burner (2) according to claim 1,
characterized in that
a diameter of the burner head (3) is about 1.05 to 1.5 times larger than a diameter of the disc (13).

7. The burner (2) according to claim 1,
characterized in that
the burner ports (11) are disposed on a single flame crown (10), the flame crown (10) being centered on the upper burner part (8).

8. The burner (2) according to claim 7,
characterized in that
an inner diameter of the mixing tube (4) has a first diameter (D1), an interior of the burner head (3) has a second diameter (D2), and the flame crown (10) has a third diameter (D3), wherein the first diameter (D1) and the third diameter (D3) are smaller than the second diameter (D2).

9. A portable stove (1) comprising a burner (2), said burner comprising:
a burner head (3), a vertical mixing tube (4) positioned beneath the burner head, a plurality of primary air ports (7) being disposed on an outer peripheral surface of the mixing tube (4) through which ambient air (A) enters the mixing tube, and an orifice (5) concentric with the mixing tube, through which a gaseous combustible enters into the mixing tube (4) to form a gaseous mixture with ambient air (A), wherein the burner head (3) is composed of an upper burner part (8) with a plurality of burner ports (11) disposed on an uppermost surface of the upper burner part, and a burner lower part (9), the lower burner part (9) being connectable to the mixing tube (4), characterized in that a dividing means (13) is disposed within the burner head (3), the dividing means (13) and the lower burner part (9) forming a first flow channel (C1) for the gaseous mixture, and the dividing means (13) and the upper burner part (8) forming a second flow channel (C2) for the gaseous mixture being connected to the first flow channel (C1), wherein a cross section area of either the first flow channel or the second flow channel (C2) is less than that of the other one, the burner head (3) is a circular burner head (3) and the dividing means (13) is a disc positioned beneath all the burner ports; and the mixing tube (4) is of a length just long enough to accommodate a diameter of the primary air ports (7).

10. The portable stove according to claim 9, characterized in that the lower burner part (9) comprises at least one supporting means (14), wherein the dividing means (13) is supported by the supporting means (14).

11. The portable stove according to claim 10, characterized in that the at least one supporting means (14) is a dent protruding from the lower burner part (9) towards the upper burner part (8).

12. The portable stove according to claim 9, characterized in that a duct height of the first flow channel (H1) is between 0.5 mm and 4 mm, preferably between 1 mm and 2 mm.

13. The portable stove according to claim 9, characterized in that a duct height of the second flow channel (H2) is between 1 mm and 8 mm, preferably between 2 mm and 4 mm.

* * * * *